Figure 1:
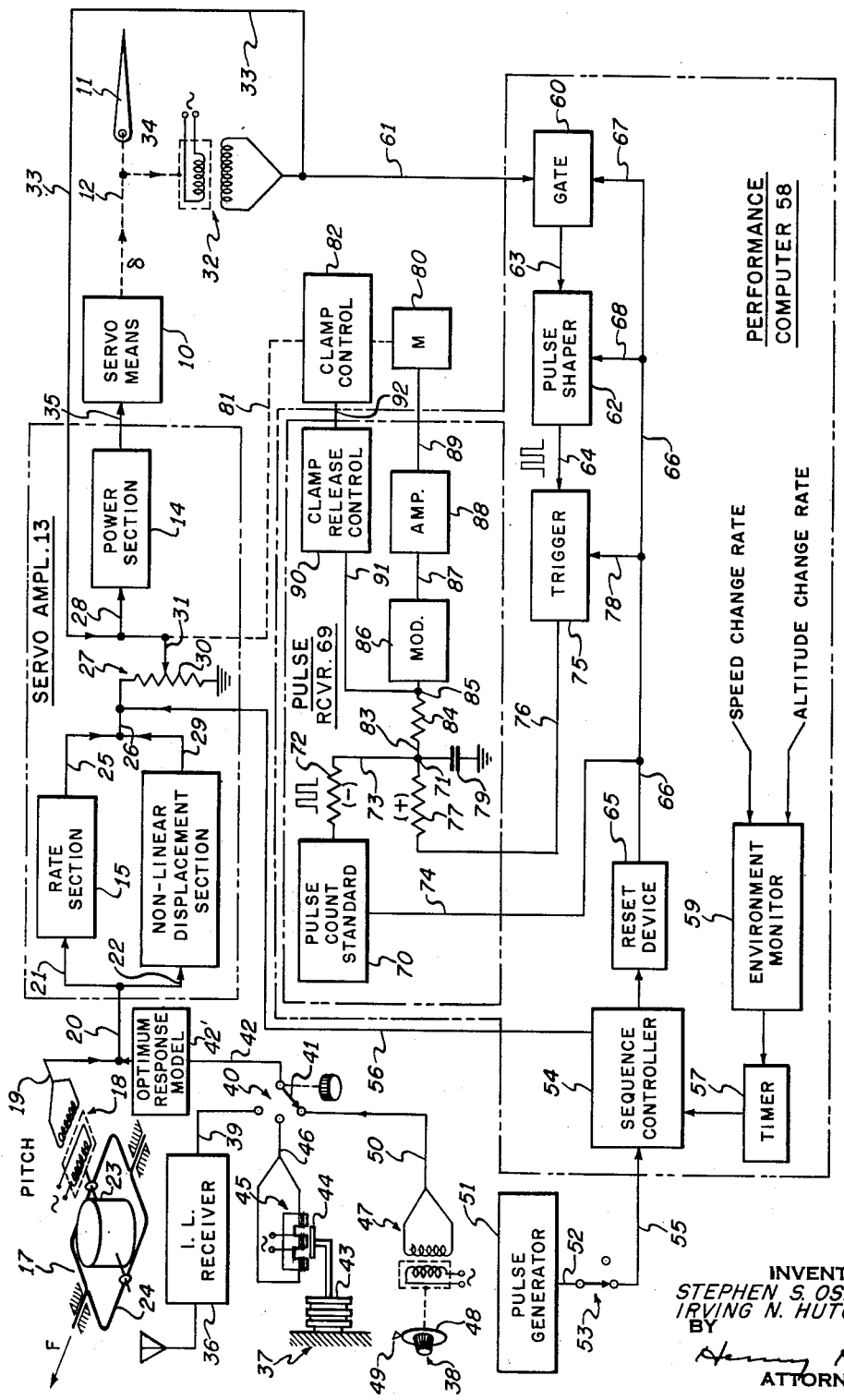

θ - PITCH ATTITUDE
δ - SERVO MOTOR OUTPUT
t - TIME

INVENTORS
STEPHEN S. OSDER
IRVING N. HUTCHINSON
BY
ATTORNEY

United States Patent Office 3,008,077
Patented Nov. 7, 1961

3,008,077
ADAPTIVE AUTOPILOT SERVO SYSTEM
Stephen S. Osder, Phoenix, Ariz., and Irving N. Hutchinson, Syosset, N.Y., assignors to Sperry Rand Corporation, Great Neck, N.Y., a corporation of Delaware
Filed Jan. 6, 1960, Ser. No. 741
15 Claims. (Cl. 318—489)

This invention relates to control systems for dirigible craft of an adaptive automatic pilot type. The system is adaptive in that it is self-regulating to maintain its performance at a predetermined pulse count standard regardless of the operative or flight conditions of the craft. Functionally, the improved system samples a pulse output periodically to obtain a measure of its actual performance. The sampled pulse information is then compared with the predetermined pulse count standard to obtain an output when a difference occurs. The difference output is then utilized to adjust the high gain level of the automatic pilot to restore the system to the performance established by the standard.

In the improved system, the automatic pilot functions at the highest gain level that the frequency band of the system permits with stability while providing oscillations therein according to the actual performance of the system. The oscillations of the system may be sensed at the servo means of the automatic pilot. The damping provided is in relation to the oscillations of the system in its performance at the predetermined standard. Known automatic pilots relate the damping to the gain level and operate at a level that will avoid any tendency of the system to oscillate under any operative or flight condition.

An object of the invention is to construct a system of the character described that is operative in a controlled frequency band that is above the natural frequency of the craft.

One of the features of the invention resides in the transducing means provided for the oscillations of the system to produce pulse output measures of the actual performance of the craft.

Another feature of the invention resides in the included pulse means provided for the automatic pilot to induce oscillations periodically in the adaptive control system that are in accordance with a known disturbance. The system is operable without excitation impulses in the presence of such random disturbances as atmospheric turbulence. However, the inclusion of the excitation impulse in the system enables the high gain level of operation of the automatic pilot to be more accurately controlled.

A third feature of the invention resides in the provision of a pulse receiver or computer for the system that provides a pulse count standard of performance and an output with departure of the actual performance of the system from the standard.

Figure 6:
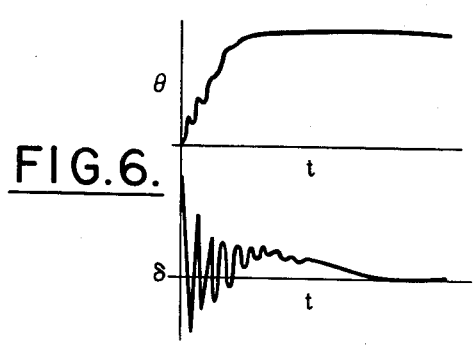
Figure 7:
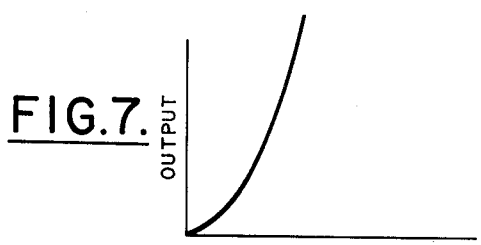
Figure 8:
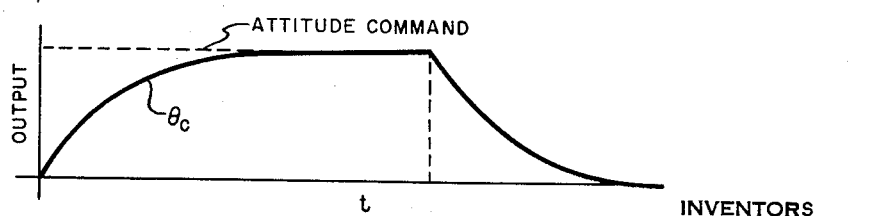

Other objects, features and structural details of the invention will be apparent from the following description when read in connection with the accompanying drawings, in which:

FIG. 1 is a schematic view and wiring diagram showing an adaptive control system embodying the present inventive concepts, FIGS. 2, 3, 4, 5 and 6 are graphs used in explanation of the operation of the system, FIG. 7 is a graph showing the input-output relation of the non-linear displacement section of the servo amplifier of the improved system, and FIG. 8 is a graph showing the output of the optimum response model of the system.

As illustrated in FIG. 1, the improved adaptive system is effective to control a craft such as an aircraft about its pitch axis through a servomotor or servo means 10 operatively connected to suitable elevators 11 by mechanical shafting 12 and reduction gearing (not shown). The servo means 10 is the output element of an automatic pilot whose input is received from a servo amplifier 13 having a power section 14, a rate section 15, and a non-linear displacement section 16. The automatic pilot further includes means for producing a signal with departure of the craft from a reference condition about its axis in the form of a conventional type of gyro vertical 17 with a pick-off 18 at the axis located athwartship the craft. This reference means provides an electrical signal output whose amplitude depends on the extent of the angular displacement of the craft from a level condition and whose phase depends on the direction of the displacement. The signal of the pick-off 18 is fed to the rate section 15 of amplifier 13 by way of leads 19, 20 and 21. Leads 19, 20 and 22 connect the pick-off 18 to the non-linear displacement section 16 of the amplifier 13. The gyro vertical of the arrangement includes a universally supported rotor case 23 having a gyroscope rotor therein (not shown) adapted to spin about a substantially vertical axis. A gimbal ring 24 provides the universal support for the case 23 with relation to the craft, the major axis of gyro vertical being directed parallel to or coincident with the fore and aft axis of the craft. The arrow F, shown in FIG. 1 with relation to the gyro vertical, is indicative of the direction of forward movement of the craft.

As shown in FIG. 1, the rate section 15 of the amplifier 13 is connected to the power section 14 by means of leads 25, 26, a gain level adjusting potentiometer 27 and lead 28. The output of the displacement section 16 of the amplifier 13 is also fed the section 14 by way of lead 29 connected to lead 26, lead 26, the potentiometer 27 and lead 28. The potentiometer 27 is illustrative of suitable means in the adaptive control system for adjusting the high gain level of the automatic pilot. As shown, one end of the resistance element 30 of the potentiometer 27 is connected to lead 26 and the other end is suitably grounded. The slider component 31 of the potentiometer is electrically connected to the input lead 28 to the power section 14. The gain level of the automatic pilot in the system is increased when the slider 31 is moved in a direction that decreases the amount of the resistance element 30 in the circuit. Movement of the slider in a reverse direction, increases the amount of the resistance element 30 in the circuit and results accordingly in a lowering of the high gain level of the system. The potentiometer 27 acts as a voltage divider or attenuator. The attenuation depends on the ratio of the portion of the resistor 30 between the slider 31 and ground to the total resistance of the potentiometer.

In addition to the signals of the pick-off 18 fed the power section 14 from the respective rate section 15 and displacement section 16 of the amplifier, a further control input is provided for the section 14 from a repeatback pick-off 32 by way of lead 33 to lead 28. As shown, the rotor of the pick-off 32, is connected to the elevator 11 by shafting 34 connected to the shafting 12 so that the same moves with the elevator as it is moved by the servomotor 10 from a trim or streamline position with relation to the craft. Pick-offs 32 and 18 may be of a conventional type in which the wound rotors are supplied with alternating current electrical energy as indicated. The wound stators of the respective pick-offs are fixed in relation to the craft. The signal from the pick-off 32 is fed back to the power section 14 of the amplifier 13 behind the potentiometer 27. The amplitude of the feedback or repeatback signal is dependent on the magnitude of the displacement of the control surface or elevators 11 from trim or a streamline position. The phase of the repeatback signal depends on the direction or sense of the displacement of the elevators 11. The output of the section 14 of the amplifier 13 is fed the servo means 10 by way of lead 35. The movement of the slider 31 of the potentiometer 27 in the arrangement shown changes the ratio between signals ahead of and behind the resistor 30 and accordingly controls the gain of the system.

Other input controllers for the system may be provided by a directional radio receiving means or instrument landing radio receiver 36, an altimeter 37 and a manual settable pick-off 38 operable to command changes in the pitch attitude of the craft. The radio receiver 36 carried by the craft is responsive to a suitable ground transmitter (not shown) which produces overlapping differently modulated field pattern lobes or other directionally characteristic radiation defining a particular desired flight path. The receiver 36 produces an output signal in accordance with the magnitude of the displacement of the craft from the predetermined radio defined path. The polarity of the output signal is dependent on the sense of the displacement of the craft from the radio path. The output of the receiver 36 may be connected to the amplifier 13 by way of lead 39 to one of the terminals of a three position switch 40 whose settable arm 41 is connected to lead 20 by way of lead 42 through an optimum response model indicated at 42'.

The altimeter controller 37 may be of the type disclosed in U.S. Patent No. 2,446,546, issued August 10, 1948, to A. W. Meston, in which one end of an atmospheric pressure responsive bellows 43 is fixed relative to the craft and the opposite end is adapted to position the armature element 44 of a pick-off 45. The stator of the pick-off 45 is fixed to the craft and includes an E-shaped magnetic core with a winding on its central leg connected to an alternating circuit electrical source. The windings on the outer legs of the core are connected so that when the armature 44 is in its central position relative to the core, equal and opposite voltages are induced therein and the net output of the pick-off is zero. Displacement of the armature 44 relative to the core produces a proportional signal output whose phase depends on the direction of the displacement of the parts. This output may be included in the system by way of the lead 46 to the second of the terminals of the switch 40.

The manual controller 38 may be provided by a pick-off 47 of the type indicated at 18 and 32, whose rotor is set by a manually adjustable knob 48 with relation to a fixed index 49. The stator winding of the pick-off 47 is fixed in relation to the craft and connected to the third terminal of the switch 40 by way of lead 50. The switch 40 is settable by the human pilot so that anyone of the described controllers may be included in the automatic pilot. As shown in FIG. 1, the switch 40 is set to include the manually settable pick-off 47 in the system.

Figure 2:
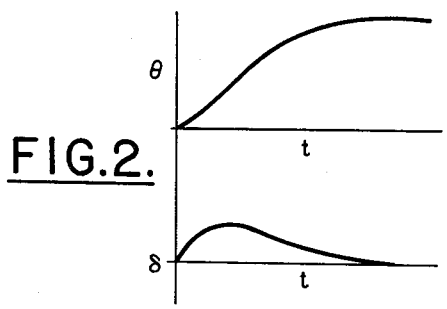
Figure 3:
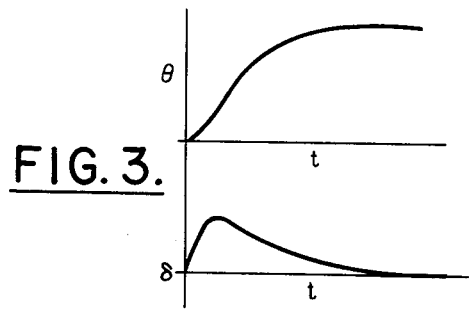
Figure 4:
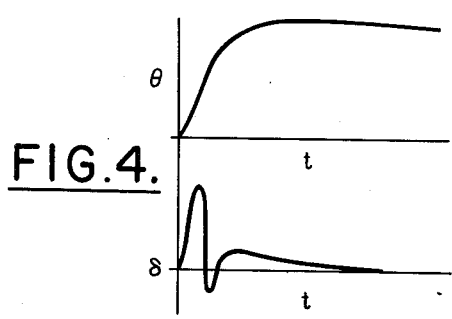
Figure 5:
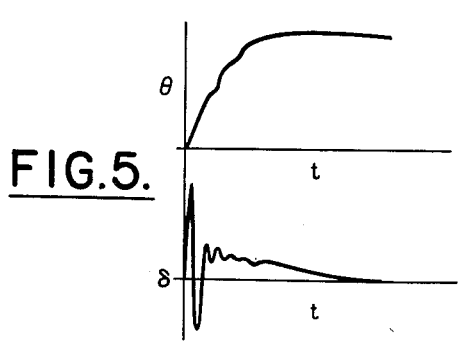

The optimum responsive model 42' of the system is a first order lag network that is electrical in character. The adaptive system is designed to force the aircraft to adhere to the desired response characteristic of the model such as represented by the curve in the graph of FIG. 8 as a pitch command output $\theta_c$. The input to the amplifier 13 in the embodiment of the invention shown in the difference between the attitude specified by the model 42' and the output of the pitch pick-off 18. The gain level of the automatic pilot is adjusted by moving the slider 31 of potentiometer 27 so as to maintain the performance of the craft in accordance with the pulse count standard provided for the system. The system is a maximum gain seeking system that operates in an oscillatory frequency band that is several times higher than the craft's aerodynamic natural frequency. The graphs in FIGS. 2 through 6, taken at increasing gain levels, demonstrate how the system performs with time in respect to compared pitch attitude angle $\theta$ and servomotor outputs $\delta$ when a change in pitch attitude is commanded by the pick-off 47 and its related knob 48. FIGS. 2 and 3 show the pitch and output values at usual automatic pilot gain levels where both the $\theta$ and $\delta$ curves are nonoscillatory. At the further increased gain level shown in FIG. 4, a single reversal appears in the output $\delta$ with no corresponding result in the related pitch angle $\theta$ curve. At the next higher gain level, oscillations appear in the output $\delta$ curve and there is a wiggle in the pitch angle $\theta$ curve. The improved system functions at the high gain level shown in FIG. 6 where an oscillatory condition is established in the output of the servomotor 10 as shown by the output $\delta$ curve. While the wiggle in the pitch angle $\theta$ curve in FIG. 6 is greater than that shown in FIG. 5, the attitude response of the system does not overshoot or reverse with the high frequency oscillations or reversals in the servomotor output $\delta$. The system operates to continuously and automatically adjust the gain of the amplifier 13 at the maximum value consistent with adequate stability within the designed frequency band of oscillation permitted the servomotor. The damping values required by the improved system are relatively low. The damping ratio is accordingly accurately correlated with the number of seromotor output reversals occurring in a given time interval.

The system is designed for operation in response to a known disturbance to produce a number of oscillations in a given time interval in the servomotor output that should correspond to a provided pulse count standard operable over the same time interval. To establish the timing interval as well to narrow the range of operation of the maximum gain control provided for amplifier 13, the system preferably includes a suitable pulse generator indicated at 51 that operates to produce such a disturbance. As shown in FIG. 1, the output of the generator 51 is fed the amplifier 13 at a point ahead of the potentiometer 27 by way of lead 52 to off-on switch 53, from switch 53 when in on condition to a sequence controller 54 through lead 55, and from the controller 54 to the lead 26 by way of lead 56. A timer 57 connected to the controller 54 establishes the basic timing cycle of the system. As represented in FIG. 1, the timer 57 and controller 54 are two of the components of the system included in a performance computer indicated at 58. The timer 57, controller 54 and generator 51 as connected to lead 26 provide a periodically operable means for providing pulse inputs to the automatic pilot to cause oscillations in the output of the servomotor or servo means 10 according to the actual performance of the system. The operations of the described means in the system produce oscillations in the servomotor output that may be in the range of 3.0 to 6.0 cycles per second. The operating cycle starts when the pulse of generator 51 is inserted in the system and for the considered range may continue for a duration of between one and a half to two seconds. An interval between operating cycles of one and a half seconds is sufficient to bound the damping ratio of the system at a minimum value of two tenths which is acceptable for good automatic pilot performance.

Under conditions of operation of the craft where its speed and/or altitude are changing, the interval between the sampling cycles may be modified by means of a suitable environment monitor indicated at 59 that is connected to the timer 57. The basic timing may be established by a slow astable multivibrator for the timer 57 whose period is changed by a voltage supplied from the monitor 59 that depends on a rate of change of speed input or a rate of change of altitude input as indicated in FIG. 1.

During each of the sampling periods of operation of the system, the computer 58 is operative to produce a fixed amplitude pulse for each of the polarity reversals measured at the output $\delta$ of the servomotor 10. The transducing means included in the system to measure the oscillations are shown in FIG. 1 as the repeatback pick-off 32, a suitable electrical gate 60 connected to the pick-off 32 by lead 61 and a suitable pulse shaper 62 that receives the output of gate 60 by way of lead 63. The output lead 64 from shaper 62 carries fixed amplitude pulses which for a particular operating cycle may be two in number as represented in FIG. 1. The pulse count output of the shaper 62 is a measure of the actual performance of the system in response to either a random disturbance or a known disturbance such as provided by the timed signal from the pulse generator 51. The sequence controller 54 operable through a reset device 65 synchronizes the operations of the gate 60 and pulse shaper 62 with the pulse input to the amplifier through lead 56. Device 65 is connected to gate 60 by leads 66 and 67. It is also connected to the pulse shaper 62 by leads 66 and 68.

As shown in FIG. 1, the computer 58 of the system includes a pulse receiver 69 and a pulse count standard 70 represented as a suitable generator that produces fixed amplitude negative pulses that are two in number over the timing cycle of operation of the controller 54. The pulses of the standard 70 are fed to the junction point 71 of the receiver 69 by way of resistor 72 and lead 73. The cyclic timing of the operation of the standard 70 is controlled from the reset device 65 by way of lead 66 and lead 74. The receiver 69 compares the pulses of the transducing means and the pulse count standard. It produces an output with departures of the actual performance of the system according to the difference in the number of pulses produced periodically during a predetermined time interval with respect to the pulse count standard. The output of the computer 58 is fed the receiver 69 by way of a suitable trigger 75 whose output lead 76 is connected to the junction 71 through resistor 77. The output of the trigger 75 is synchronized in the timing cycles by connection to the reset device 65 through lead 66 and lead 78. As shown, the junction is connected to ground through a condenser 79. Where the compared pulses are of equal number and opposite polarities as indicated in the drawing, there is no output from the receiver or output means 69 so that the high gain level of the amplifier remains at the value determined by the potentiometer 27.

When the pulse count of the computer 58 is less than the pulse count standard, the receiver 69 produces an output that increases the gain level of the amplifier 13 by moving the slider 31 in a direction that lowers the attenuation of the potentiometer 27. The gain level adjusting means provided in the system is controlled by the output of the receiver 69 and includes a motor 80 connected to slider 31 by shafting 81 through a clamp control 82. Motor 80, as shown, is connected to the junction 71 by way of lead 83, resistor 84, lead 85, modulator 86, lead 87, amplifier 88 and lead 89. The motor 80 operates in the reverse direction to lower the gain level of the amplifier 13 when the pulse output count of the trigger 75 is greater in number than the pulse count provided by the standard 70. The system is accordingly operative to continuously adjust the gain level of the automatic pilot to restore its actual performance to the predetermined standard.

Motor 80 functions in the system as an integrator for the signal output of the receiver 69. The clamp control 82 engages the shafting 81 to hold the slider 31 in adjustable relation to the resistor 30. The clamp control means 82 is released by means of a polarity sensitive clamp release control 90 that permits the motor 80 to increase the gain of the amplifier if the output of the receiver 69 over two successive cycles or sampling periods is less than the pulse count of the standard 70. When the count is greater than the standard, the release control 90 is immediately effective to reduce the gain of the amplifier 13. The shaft of the motor 80 is engaged by the clamp control so as to avoid continuous operation over long periods when the timing cycle is long. As shown, release control 90 is connected to the output lead 85 by way of lead 91. A connecting lead is provided between the clamp control 82 and the clamp release control 90.

The adaptive control system as described adjusts the automatic pilot gain to the maximum level consistent with stability. In some control problems, this gain may not be sufficient to produce the required tightness in the error input to the amplifier 13. To maintain the operations of the system to within defined tightness limits, the nonlinear displacement section 16 of the amplifier 13 provides for a sharp increase in the signal displacement output as the error input increases as shown by the curve in FIG. 7. Thus, if stability limitations determined by the performance computer 58 cause the automatic pilot gain to be reduced to a relatively low value where its ability to follow model commands is compromised, the nonlinear section 16 provides a compensating control augmentation.

While the invention has been described in its preferred embodiment, it is to be understood that the words which have been used are words of description rather than of limitation and that changes within the purview of the appended claims may be made without departing from the true scope and spirit of the invention in its broader aspects.

What is claimed is:

1. An adaptive control system for dirigible craft including an automatic pilot with an adjustable high gain level and servo means operable to move the craft about an axis, periodically operable means for providing pulse inputs to the automatic pilot to cause oscillations in the output of the servo means according to the actual performance of the system, transducing means providing pulses corresponding to the oscillations of the servo means, a pulse count standard of performance for the system, means controlled by the pulse count standard and transducing means for providing an output with departures of the actual performance of the system from the standard according to the difference in the number of pulses produced periodically by the transducing means during a predetermined time interval with respect to the pulse count standard, and means responsive to the output of said difference output means for adjusting the gain level of the automatic pilot to restore the adaptive system to the standard of performance.

2. A system of the character claimed in claim 1, including means connected to said pulse input means for modifying the time interval between the operative periods thereof in accordance with the conditions of operation of the craft.

3. In an adaptive control system for dirigible craft, an automatic pilot with an adjustable high gain level and servo means operable to move the craft about an axis, transducing means providing pulses in accordance with oscillations in the output of the servo means, a pulse count standard of performance for the system, means operable by the pulse count standard and transducing means for providing an output with departures of the actual performance of the system from the standard according to the difference in the number of pulses produced periodically by the transducing means during a predetermined time interval with respect to the pulse count standard, and means responsive to the output of said difference output means for adjusting the gain level of the automatic pilot to restore the adaptive system to the standard of performance.

4. A control system of the character claimed in claim 3, including periodically operable means for providing pulse inputs to the automatic pilot to induce the oscillations in the output of the servo means.

5. A control system of the character claimed in claim 3, including periodically operable means for providing pulse inputs to the automatic pilot to induce the oscillations in the output of the servo means, and means connected to said pulse input means for modifying the time interval between the operative periods thereof in accordance with the conditions of operation of the craft.

6. In an adaptive control system for dirigible craft, an automatic pilot with servo means having an output operable to move the craft about an axis, and periodically operable means for providing pulse inputs to the automatic pilot to cause oscillations in the output of the servo means according to the actual performance of the system.

7. In an adaptive control system for dirigible craft, an automatic pilot with an adjustable high gain level and servo means operable to move the craft about an axis, actual performance sensing means providing pulses in accordance with oscillations in the output of the servo means, a periodically operable receiver for the pulses of the sensing means providing a pulse count standard of performance for the system and an output with departure of the actual performance of the system from the standard, and means for adjusting the gain level of the automatic pilot to restore the system to the performance standard responsive to the output of said receiver.

8. An adaptive aircraft control system including means for producing a signal with departures of the craft from a reference condition about an axis, an adjustable high gain amplifier receiving the signal of said reference means having an output, a servomotor responsive to the output of said amplifier controlling the craft about the reference axis, periodically operable means for feeding pulses to the amplifier to cause oscillations in the output of said servomotor according to the actual performance of the system, means including a pick-off at the output of said servomotor producing pulses corresponding to the oscillations, a periodically operable receiver for the pulses of said pulse producing means providing a pulse count standard of performance for the system and an output with departure of the actual performance of the system from the standard, and means for adjusting the gain of the amplifier in accordance with the output of the receiver.

9. A system of the character claimed in claim 8, including means for modifying the time interval between the operative periods of said pulse feeding means in accordance with the change rate of the speed and altitude of the craft.

10. A system of the character claimed in claim 8, in which said amplifier includes a rate section, a power section, and a nonlinear displacement section.

11. In an adaptive aircraft control system with means for producing a signal with departure of the craft from a reference condition about an axis, an adjustable high gain amplifier receiving the signal of said reference means having an output, and a servomotor responsive to the output of said amplifier controlling the craft about the reference axis; means including a pick-off at the output of said servomotor producing pulses corresponding to the actual performance of the system, a periodically operable receiver for the pulses of said pulse producing means providing a pulse count standard of performance for the system and an output with departure of the actual performance of the system from the standard, and means for adjusting the gain of the amplifier in accordance with the output of said receiver.

12. A control system of the character claimed in claim 11, including periodically operable means for feeding pulses to the amplifier.

13. A control system of the character claimed in claim 11, including periodically operable means for feeding pulses to the amplifier, and means connected to said pulse feeding means for modifying the time interval between the operative periods thereof in accordance with the change rate of the speed and altitude of the craft.

14. A control system of the character claimed in claim 11, in which said amplifier includes a nonlinear displacement section.

15. A control system of the character claimed in claim 11, including means for clamping the gain adjusting means, and means operable by the output of said receiver for releasing said clamping means.

References Cited in the file of this patent

UNITED STATES PATENTS

| | | |
|---|---|---|
| 2,855,557 | Gallagher | Oct. 7, 1958 |
| 2,880,384 | Surtees | Mar. 31, 1959 |
| 2,941,139 | Marx | June 14, 1960 |